(12) United States Patent
Chow

(10) Patent No.: US 6,237,738 B1
(45) Date of Patent: May 29, 2001

(54) TRANSMISSION FOR A DUNE BUGGY

(75) Inventor: Chi-Lu Chow, Tainan (TW)

(73) Assignee: Reimech Corporation (TW)

( * ) Notice: Subject to any disclaimer, the term of this patent is extended or adjusted under 35 U.S.C. 154(b) by 0 days.

(21) Appl. No.: 09/444,212

(22) Filed: Nov. 19, 1999

(51) Int. Cl.$^7$ ........................................ F16H 3/12
(52) U.S. Cl. ............................... 192/218; 74/331
(58) Field of Search .............................. 192/218; 74/361, 74/331

(56) References Cited

U.S. PATENT DOCUMENTS

| | | | |
|---|---|---|---|
| 5,014,566 | * | 5/1991 | Kashiwase ............................... 74/331 |
| 6,021,684 | * | 2/2000 | Alfredsson ............................... 74/331 |

* cited by examiner

*Primary Examiner*—Rodney H. Bonck
(74) *Attorney, Agent, or Firm*—Kolisch Hartwell Dickinson McCormack & Heuser

(57) ABSTRACT

A transmission for a dune buggy includes an engine, a gearbox, a rear transmission set and a differential. The engine has a drive wheel attached thereto. The gearbox has an input axle mounted therein and extending through the gearbox to connect with a driven wheel. A belt connects the drive wheel and the driven wheel. The gearbox has an output axle mounted therein and extending through the gearbox to connect with a sprocket wheel. The rear transmission set has a first rear wheel axle, a second rear wheel axle and a sprocket. The sprocket is mounted on the second rear wheel axle and is connected to the sprocket wheel by a chain. The differential connects the first rear wheel axle and the second rear wheel axle. The gearbox has several axles and multiple gears. By the engagement of these axles and gears, the transmission can provide a forward drive train or a reverse drive train for a dune buggy.

2 Claims, 6 Drawing Sheets

TRANSMISSION FOR A DUNE BUGGY

BACKGROUND OF THE INVENTION

1. Field of the Invention

The present invention relates to a transmission, and more particularly to a transmission for a dune buggy. The transmission has a forward drive train and a reverse drive train.

2. Description of Related Art

Generally, conventional dune buggy transmissions types in accordance with the prior art are either four-wheel-drive or two-wheel-drive capable of driving forward or reverse. Each of wheels needs a differential to operate. Most of makers mount a differential on the front wheel axle and rear wheel axle to drive the four wheels each having a different speed rate. The differential is complicated and has a complex assembly process. Consequently, the differential is very expensive. It is vexing to have to pay a lot of money to make or buy a dune buggy.

The present invention has arisen to mitigate and/or obviate the disadvantages of the conventional dune buggy transmission.

SUMMARY OF THE INVENTION

In accordance with one aspect of the present invention, a dune buggy transmission includes an engine, a gearbox, a rear transmission set and a differential. A belt connects the engine and the gearbox. A chain connects the gearbox and the rear transmission set. The differential is attached to the rear transmission. The gearbox has several axles and multiple gears. With the alternate engagement of these axles and gears, the transmission can provide a forward drive train or a reverse drive train for a dune buggy.

Further benefits and advantages of the present invention will become apparent after a careful reading of the detailed description with appropriate reference to the accompanying drawings.

DETAILED DESCRIPTION OF THE INVENTION

Figure 1:
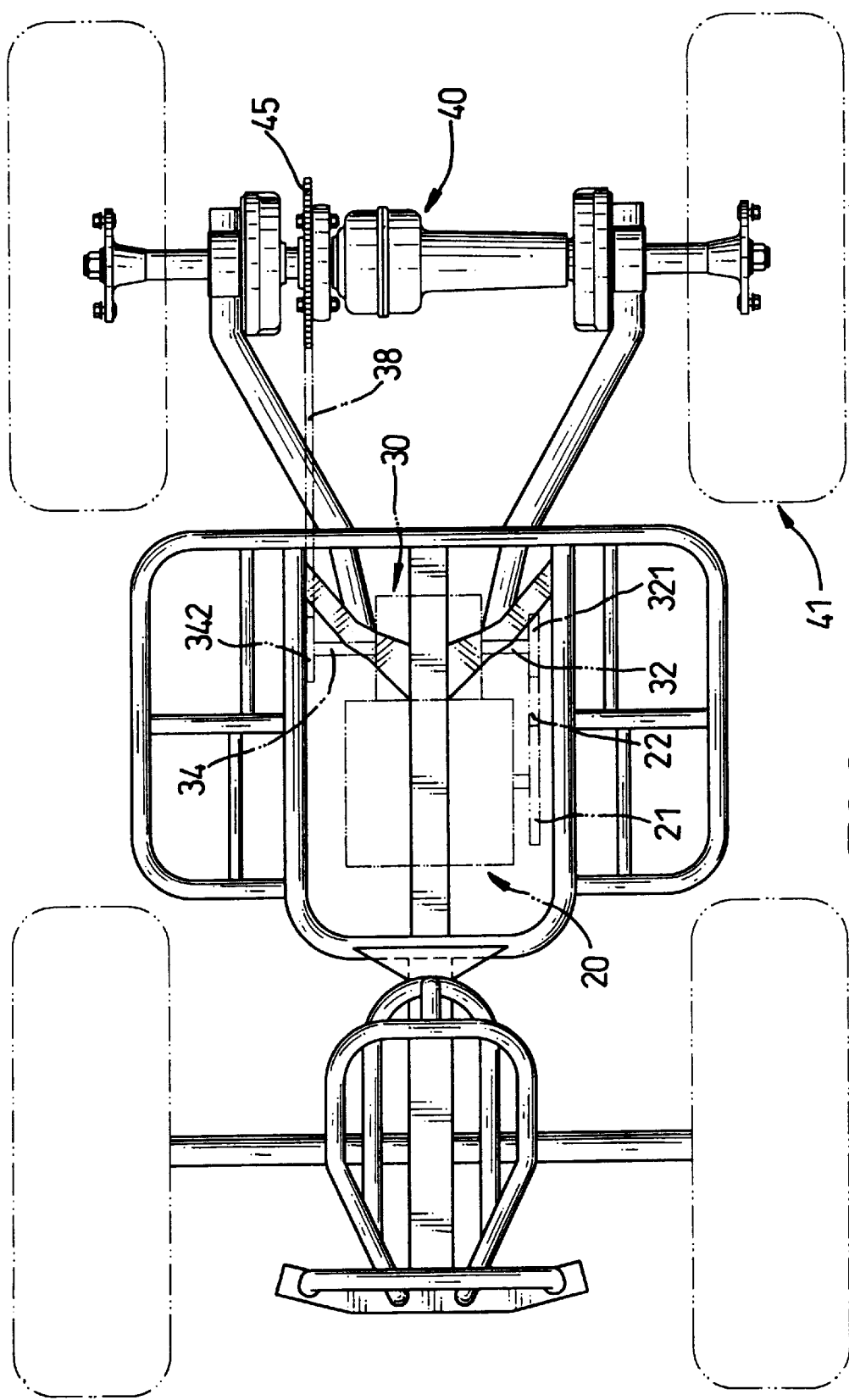
FIG. 1 is a top plan view of dune buggy frame with a transmission in accordance with the present invention.
Figure 5:
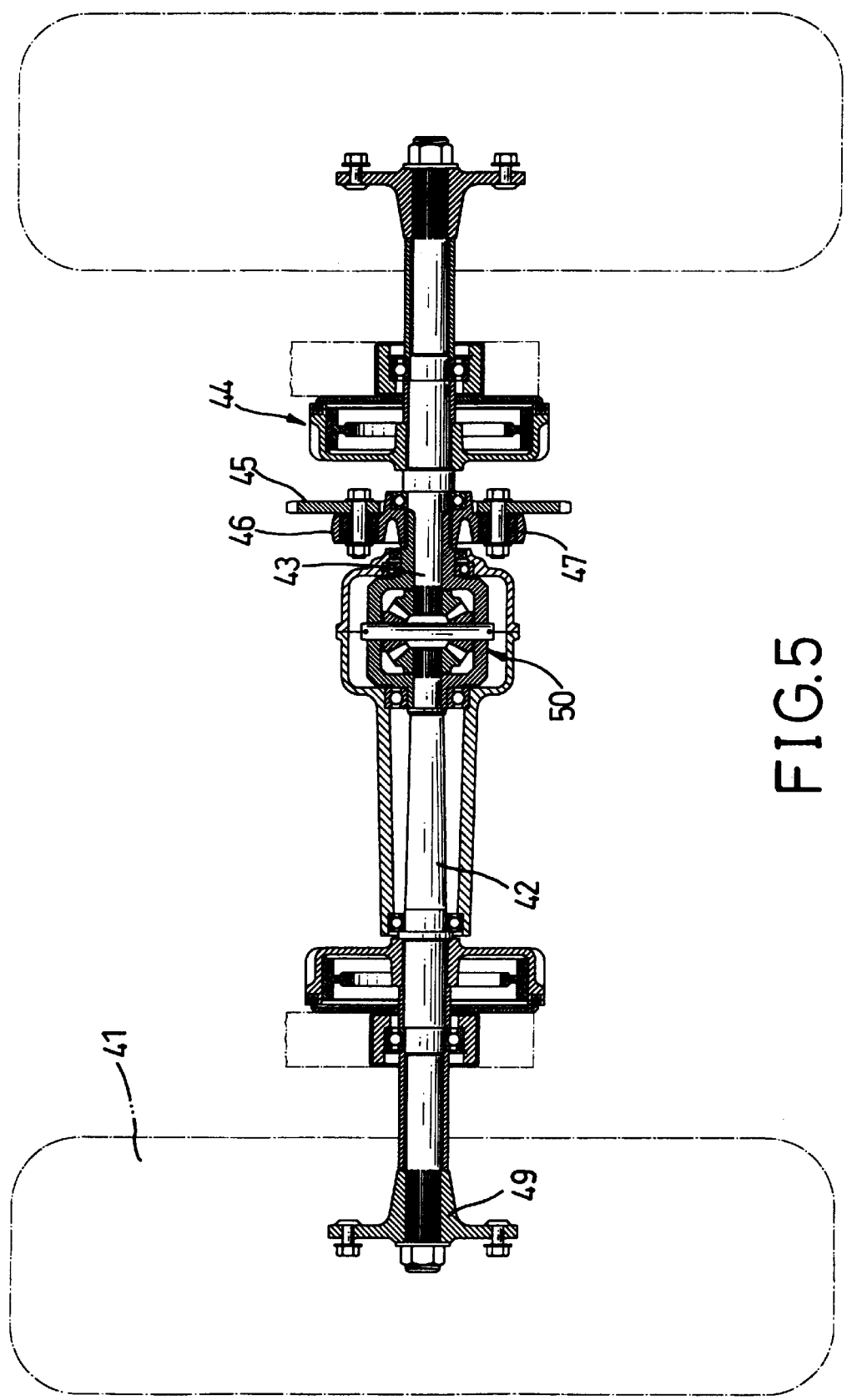
FIG. 5 is a front plan view in partial section of the rear transmission set in FIG. 1.

Referring to the drawings and initially to FIGS. 1 and 5, the transmission includes an engine (20), a gearbox (30), a rear transmission set (40) and a differential (50).

The engine (20) has a drive wheel (21) attached to the engine (20) drive shaft (not numbered), and a belt (22) is connected to the drive wheel (21).

Figure 2:
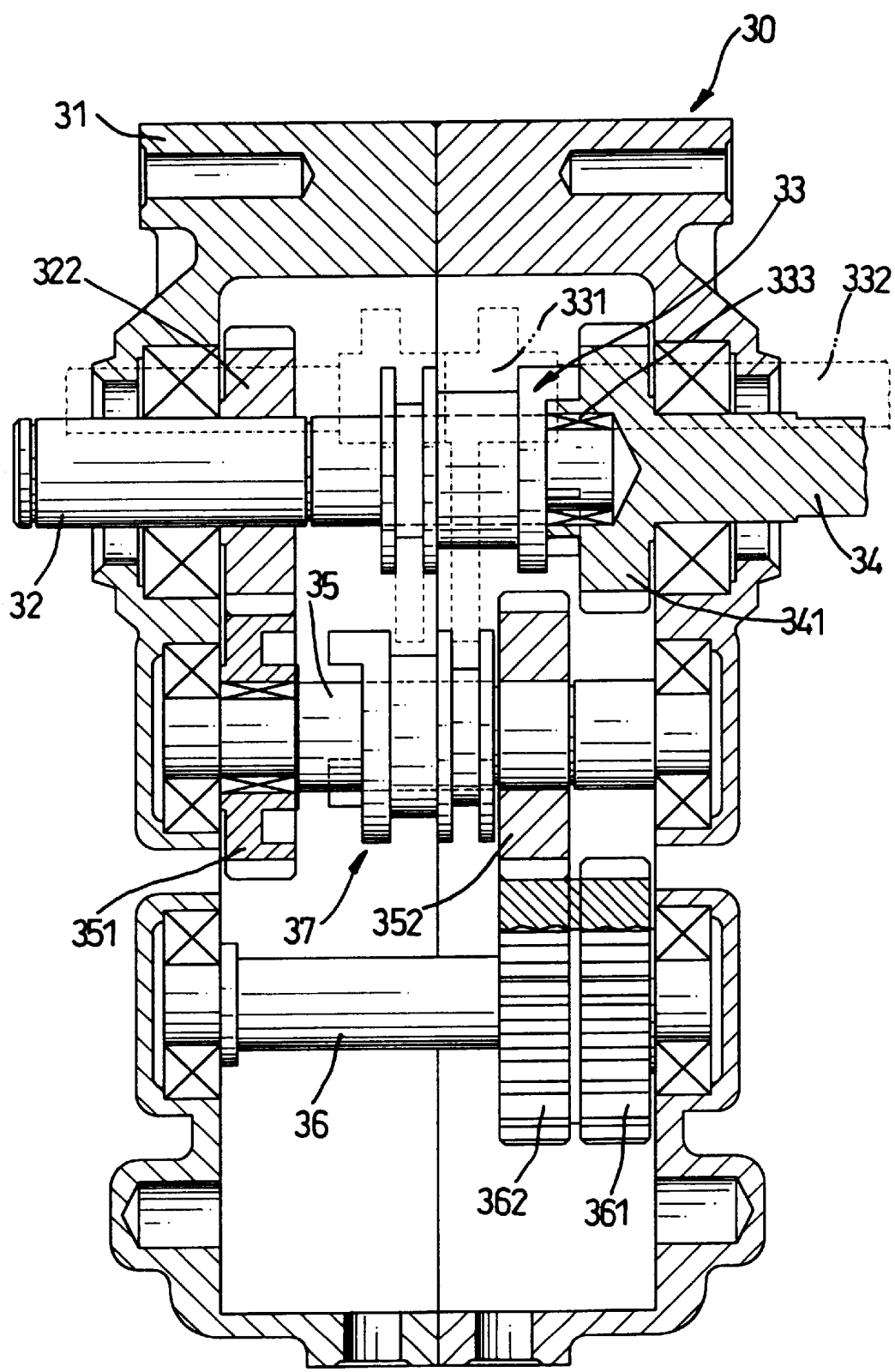
FIG. 2 is top plan view in partial section of the gearbox in FIG. 1 with the forward drive train engaged.
Figure 3:
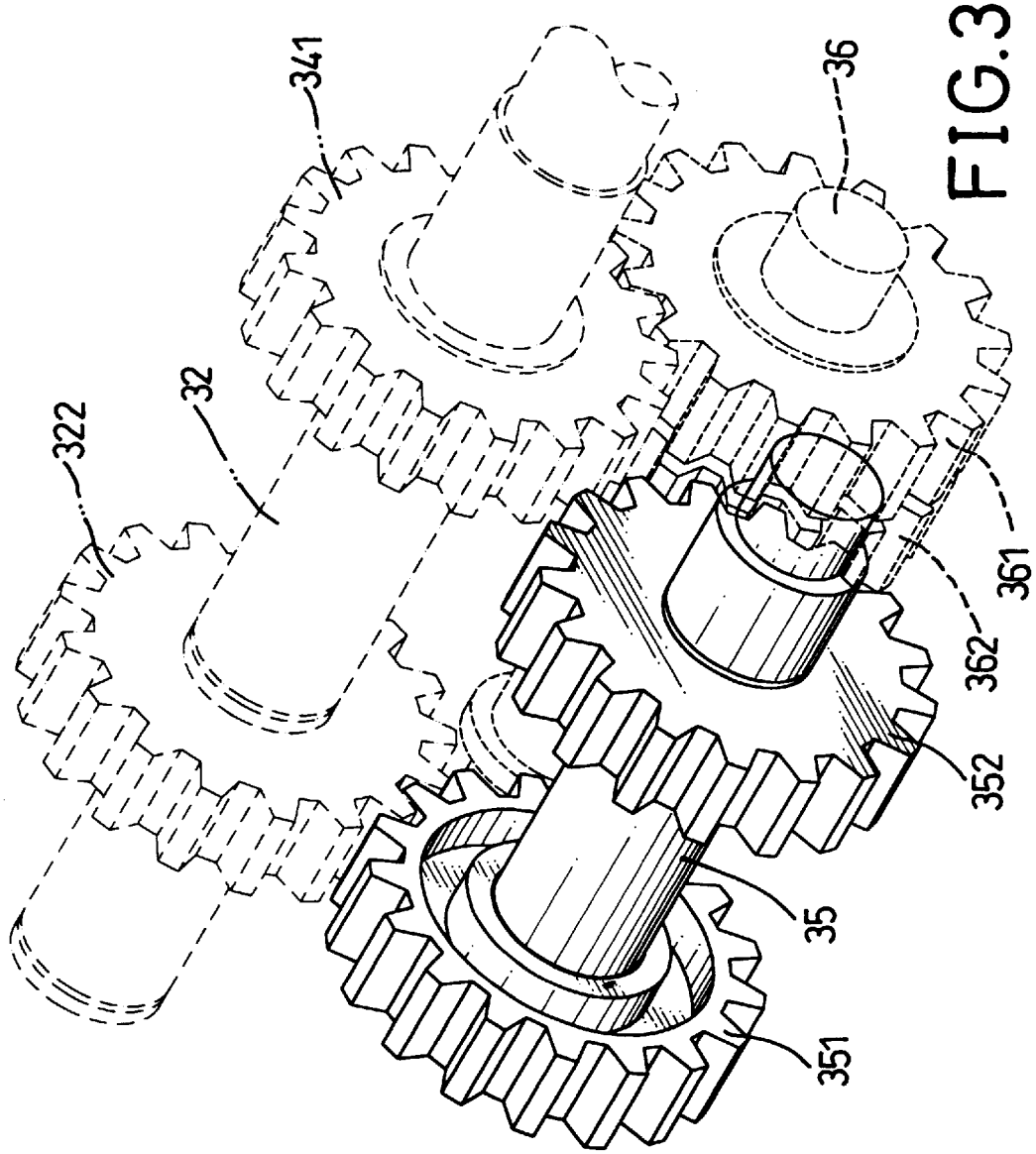
FIG. 3 is a perspective view of the gears in the gearbox in FIG. 2.
Figure 4:
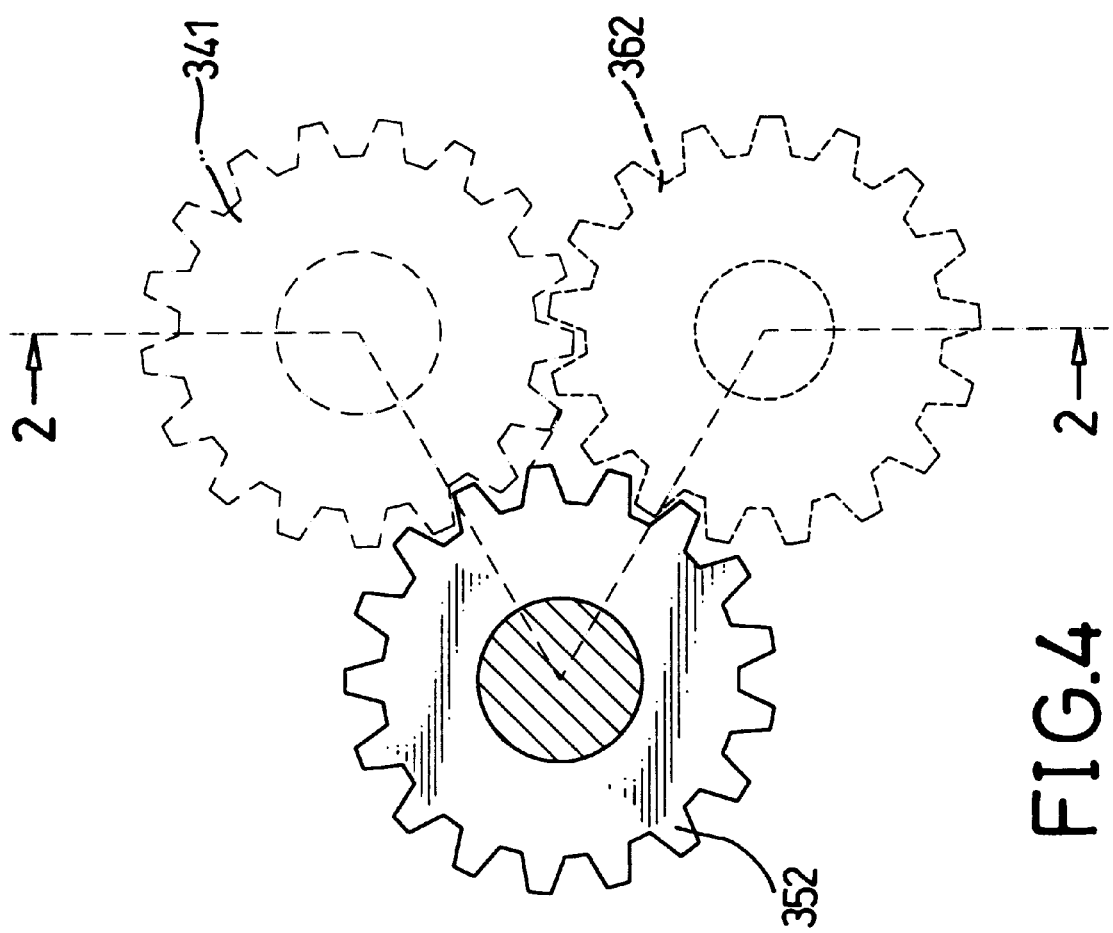
FIG. 4 is a side plan view of the gears in FIG. 3 in use.

Referring to FIGS. 1, 2 and 3, the gearbox (30) has a casing (31) that encloses all the parts of the gearbox (30). An input axle (32) is mounted in the gearbox (30) and partially extends through the casing (31). An input gear (322) is securely mounted on the input axle (32) inside the gearbox.

A first clutch plate (33) is moveably splined on the input axle (32). A driven wheel (321) is mounted on the input axle (32) outside the gearbox (30). The driven wheel (321) is connected to the drive wheel (21) by the belt (22). An output axle (34) extends through the casing (31). The output axle (34) is aligned with the first clutch plate (33) and pivotally connects to the input axle (32). An output gear (341) is securely mounted on one end of the output axle (34) inside the casing (31). A sprocket wheel (342) is attached to the output axle (34) outside the gearbox (30). A drive chain (38) is engaged by the sprocket wheel (342).

A gear axle (35) is mounted in the casing (31) with a first gear (351) securely mounted on one end of the gear axle (35) and engaged with the input gear (322). A second gear (352) is securely mounted on the other end of the gear axle (35). A second clutch plate (37) is splined on the gear axle (35) between the first gear (351) and the second gear (352). A claw (331) is mounted in the gearbox and has a first portion and a second portion. The first portion of the claw (331) abuts the first clutch plate (33) and the second clutch plate (37). A shift axle (332) is connected to the second portion of the claw (331) that is controlled by the shift axle (332).

An idle axle (36) is mounted in the gearbox (30). A first idle gear (361) and a second idle gear (362) are securely mounted on output end of the idle axle (36). The first idle gear (361) is engaged with the output gear (341) and the second idle gear (362) is engaged with the second gear (352). The input axle (32), the gear axle (35) and the idle axle (36) are parallel.

Referring to FIG. 5, the rear transmission set (40) has a first rear wheel axle (42) and a second rear wheel axle (43) each having a brake (44) mounted thereon. Each of the first rear wheel axle (42) and the second rear wheel axle (43) has a first end connected by a differential (50) and a second end having a hub (49) attached thereto. A sprocket wheel seat (46) is securely mounted on the second rear wheel axle (43) and receiving a shock absorber (47) therein. A sprocket wheel (45) is attached to the sprocket wheel seat (46) and connected to the sprocket wheel (342) by the chain (38).

The transmission for a dune buggy has a forward drive train and a reverse drive train, which are mentioned as follows.

1. Forward drive train, referring to FIGS. 1 and 2, the first clutch plate (33) is engaged with the output gear (341) and the second clutch (37) is detached from the first gear (351) by the claw (331) and the shift axle (332). Then the gear axle (35) and the idle axle (36) are idle. The drive wheel (21) of the engine (20) is forward and is driving by the driven wheel (321) of the input axle (32) by the belt (22). Therefore, forward power is transferred to the output axle (34) and the sprocket wheel (342). The sprocket wheel (45) mounted on the second rear wheel axle (43) is driven by the chain (38) to make the dune buggy moving forward.

Figure 6:
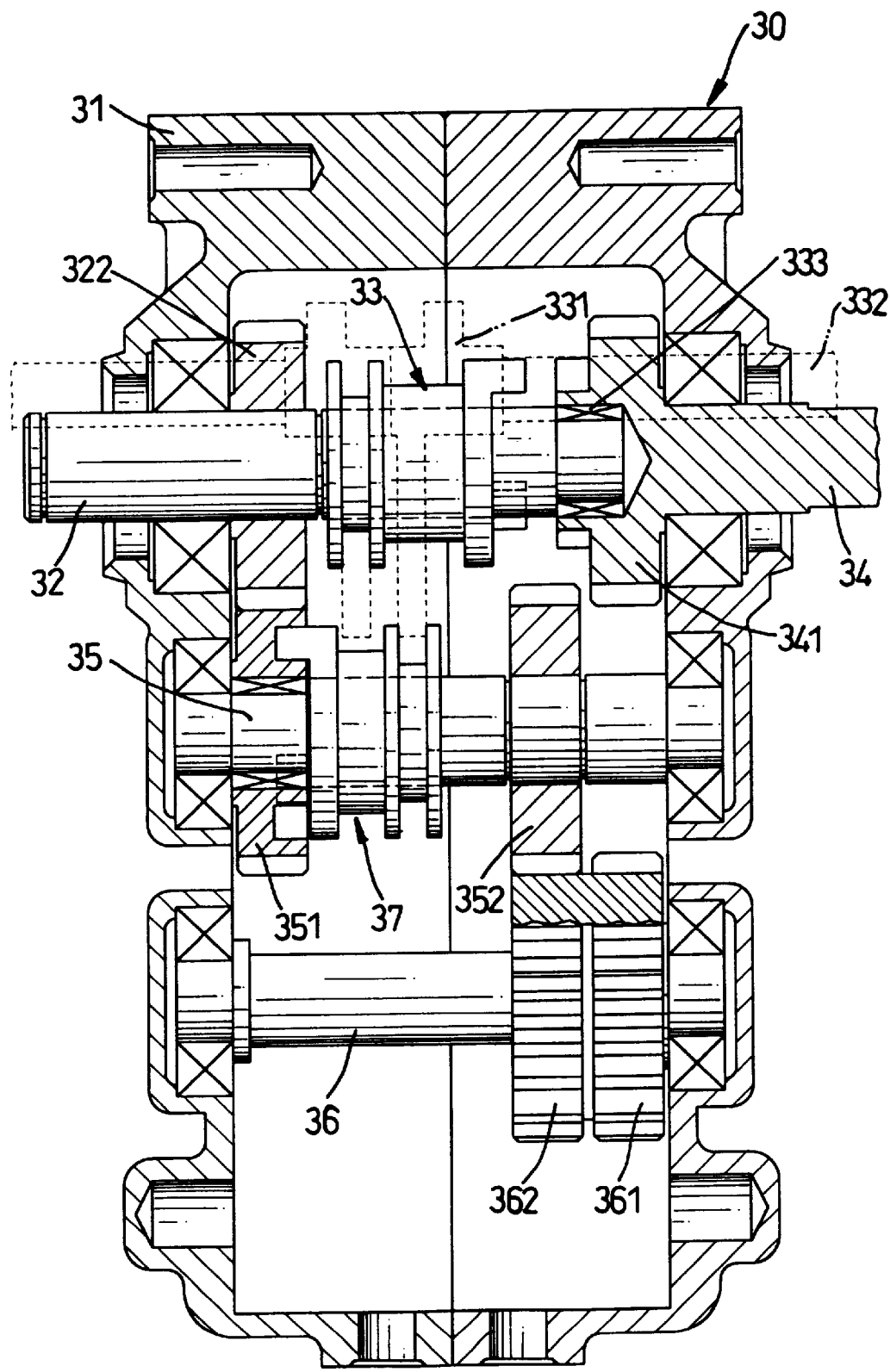
FIG. 6 is top plan view in partial section of the gearbox in FIG. 1 with the reverse drive train engaged.

2. Reverse drive train, referring to FIGS. 2 and 6, the first clutch plate (33) is detached from the output gear (341) and the second clutch plate (37) is engaged with the first gear (351) by the claw (331) and the shift axle (332). The drive wheel (21) of the engine (20) turns forward and drives the driven wheel (321) of the input axle (32) by the belt (22). Then the forward power is transferred to the first gear (351) by the input gear (322) to make the first gear (351) and the second gear (352) turned in the opposite or reverse direction. The second gear (352) drives the second idle gear (362) and makes the second idle gear (362) and the first idle gear (361) turned forward. Then the first idle gear (361) transfers the output gear (341) and makes the output gear (341) turn in a reverse direction since the output gear (341) is engaged with the first idle gear (361). Therefore, reverse power is transferred to the output axle (34) and the sprocket wheel (342). The sprocket wheel (45) mounted on the second rear wheel axle (43) is driven by the chain (38) to make the dune buggy moving backwards.

The two hubs (49) each has a rear tire (40) mounted thereon. The differential (50) which connects the first rear wheel axle (42) and the second rear wheel axle (43) can provide two different rotating rates to these two rear tires (40). By having a different rotating rate for the two rear tires (40) the dune buggy can turn without spinning or dragging one of the rear tires.

Because of the simplicity of the transmission in accordance with the present invention, the transmission for a dune buggy can reduce the price of the dune buggy and simplify assembly because the transmission has only one differential. Furthermore, the gearbox of the transmission can provide forward and reverse drive trains for a dune buggy. It is a convenient design for a user to control the dune buggy.

Although the invention has been explained in relation to its preferred embodiment, it is to be understood that many other possible modification and variation can be made without departing from the spirit and scope of the invention as hereinafter claimed.

What is claimed is:

1. A transmission for a dune buggy comprising:

an engine having a drive wheel attached thereto and a belt connected with said drive wheel;

a gearbox including a casing to receive an input axle, an output axle, a gear axle, and an idle axle, said input axle mounted in said gearbox and extending through said casing;

an input gear received in said gearbox and securely mounted on said input axle;

a first clutch plate splined on said input axle and a driven wheel mounted on said input axle outside said gearbox, said driven wheel connected to said drive wheel by said belt;

said output axle mounted in said gearbox and extending through said casing, said output axle aligning with said first clutch plate and pivotally connected to said input axle;

an output gear securely mounted on one end of said output axle inside said casing;

a sprocket wheel attached to said output axle outside said gearbox and a chain connected to said sprocket wheel;

said gear axle mounted in said casing and having a first end and a second end;

a first gear securely mounted on said first end of said gear axle and engaged with said input gear;

a second gear securely mounted on said second end of said gear axle;

a second clutch plate splined on said gear axle between said first gear and said second gear;

a claw mounted in said gearbox and having a first portion and a second portion, said first portion of said claw abutting said first clutch plate and said second clutch plate;

a shaft axle connected to said second portion of said claw;

said idle axle mounted in said gearbox;

a first idle gear and a second idle gear securely mounted on one end of said idle axle by one side of said output axle, said first idle gear engaged on said output gear and said second idle gear engaged on said second gear, said input axle, said gear axle, and said idle axle being parallel;

a rear transmission set including a first rear wheel axle and a second rear wheel axle, each having a brake mounted thereon, said first rear wheel axle and said second rear axle each having a first end and second end, said two second ends of said first rear wheel axle and said second rear wheel axle, each having a hub attached thereto;

a differential connecting two first ends of said first rear wheel axle and said second rear wheel axle;

a sprocket wheel seat securely mounted on said second rear wheel axle and receiving a shock absorber therein; and a sprocket attached to said sprocket wheel seat and connected to said sprocket wheel by said chain.

2. The transmission for a dune buggy in accordance with claim 1, wherein said claw is controlled by said shift axle.

* * * * *